United States Patent

Mukouyama

(10) Patent No.: US 10,177,925 B2
(45) Date of Patent: Jan. 8, 2019

(54) RADIO COMMUNICATION DEVICE AND METHOD FOR CONTROLLING RADIO COMMUNICATION DEVICE

(71) Applicant: NEC Corporation, Tokyo (JP)

(72) Inventor: Motohiro Mukouyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/021,420

(22) PCT Filed: Sep. 10, 2014

(86) PCT No.: PCT/JP2014/004633
§ 371 (c)(1),
(2) Date: Mar. 11, 2016

(87) PCT Pub. No.: WO2015/037225
PCT Pub. Date: Mar. 19, 2015

(65) Prior Publication Data
US 2016/0226667 A1 Aug. 4, 2016

(30) Foreign Application Priority Data

Sep. 13, 2013 (JP) .................................. 2013-190691

(51) Int. Cl.
*H04L 12/10* (2006.01)
*H02J 17/00* (2006.01)

(52) U.S. Cl.
CPC .............. *H04L 12/10* (2013.01); *H02J 17/00* (2013.01)

(58) Field of Classification Search
CPC ......... H04W 52/04–52/60; H04L 12/10; H02J 17/00
See application file for complete search history.

(56) References Cited

U.S. PATENT DOCUMENTS 8,793,511 B1 * 7/2014 Bishara .................. G06F 1/266
713/300
2005/0240784 A1 10/2005 Sugasawa
(Continued)

FOREIGN PATENT DOCUMENTS

JP 2005-316593 11/2005
JP 2009-44907 2/2009
(Continued)

OTHER PUBLICATIONS

International Search Report and Written Opinion dated Oct. 7, 2014 in corresponding PCT International Application.
(Continued)

*Primary Examiner* — Raymond Dean
(74) *Attorney, Agent, or Firm* — Finnegan, Henderson, Farabow, Garrett & Dunner, L.L.P.

(57) ABSTRACT

A radio communication device (1) according to the present invention is supplied with power through a communication cable (21). The radio communication device (1) includes a control unit that determines a setting content of the radio communication device (1) so that an amount of power consumption does not exceed an amount of power supply supplied to the radio communication device (1), the amount of the power consumption being calculated by using power consumption information associating the setting content of the radio communication device (1) with power consumption consumed when the radio communication device (1) operates with that setting content. According to the present invention, it is possible to provide a radio communication device capable of realizing a stable operation even when a feed system that supplies power through a communication cable is used.

17 Claims, 10 Drawing Sheets

(56) References Cited

U.S. PATENT DOCUMENTS

| | | | |
|---|---|---|---|
| 2009/0214197 A1 | 8/2009 | Kawada | |
| 2010/0046479 A1* | 2/2010 | Sampath | H04W 52/243 370/335 |
| 2011/0077044 A1* | 3/2011 | Sampath | H04W 52/146 455/522 |

FOREIGN PATENT DOCUMENTS

| | | | |
|---|---|---|---|
| JP | 2009-89258 | | 4/2009 |
| JP | 2012-16082 | | 1/2012 |
| JP | 2012016082 A | * | 1/2012 |
| JP | 2012-228099 | | 11/2012 |
| JP | 2013-109688 | | 6/2013 |

OTHER PUBLICATIONS

Extended European Search Report issued by the European Patent Office in counterpart European Patent Application No. 14844689.1, dated Mar. 15, 2017.

* cited by examiner

| SETTING CONTENT | POWER CONSUMPTION |
|---|---|
| TRANSMISSION CAPACITY A | a (W) |
| TRANSMISSION CAPACITY B | b (W) |
| TRANSMISSION CAPACITY C | c (W) |
| ⋮ | ⋮ |
| MODULATION MODE E | e (W) |
| MODULATION MODE F | f (W) |
| MODULATION MODE G | g (W) |
| ⋮ | ⋮ |
| TRANSMISSION POWER P | p (W) |
| TRANSMISSION POWER Q | q (W) |
| TRANSMISSION POWER R | r (W) |
| ⋮ | ⋮ |
| XPIC (on) | v (W) |
| XPIC (off) | x (W) |
| ⋮ | ⋮ |
| REDUNDANT CONFIGURATION (HOT-STANDBY) | y (W) |
| REDUNDANT CONFIGURATION (COLD-STANDBY) | z (W) |

Fig. 4

| SETTING CONTENT | POWER CONSUMPTION |
|---|---|
| SETTING S | s (W) |
| SETTING T | t (W) |
| SETTING U | u (W) |
| ⋮ | ⋮ |

Fig. 5

RADIO COMMUNICATION DEVICE AND METHOD FOR CONTROLLING RADIO COMMUNICATION DEVICE

CROSS-REFERENCE TO RELATED PATENT APPLICATIONS

This application is a National Stage Entry of International Application No. PCT/JP2014/004633, filed Sep. 10, 2014, which claims priority from Japanese Patent Application No. 2013-190691, filed Sep. 13, 2013. The entire contents of the above-referenced applications are expressly incorporated herein by reference.

TECHNICAL FIELD

The present invention relates to a radio communication device and a method for controlling a radio communication device.

BACKGROUND ART

As an example of a power supply system that supplies power to an electronic apparatus through a communication cable, there is a PoE (Power Over Ethernet®) feed system. The PoE feed system is a system that supplies power from PSE (POWER Source Equipment) to a PD (Powered Device) by using a communication cable. The PoE feed system is specified under the standards such as IEEE (Institute of Electrical and Electronic Engineers) 802.3af and IEEE 802.3at.

Patent Literatures 1 to 3 discloses techniques related to a powered device using the PoE feed system. Patent Literature 1 discloses a technique related to a powered device capable of operating even when power used by the load of the powered device itself exceeds the specified value. Patent Literature 2 discloses a technique related to a power transmission system capable of making effective use of limited power. Patent Literature 3 discloses a technique related to a powered device capable of performing a stable operation.

CITATION LIST

Patent Literature

Patent Literature 1: Japanese Unexamined Patent Application Publication No. 2012-16082
Patent Literature 2: Japanese Unexamined Patent Application Publication No. 2009-89258
Patent Literature 3: Japanese Unexamined Patent Application Publication No. 2009-44907

SUMMARY OF INVENTION

Technical Problem

In a feed system (e.g., a PoE feed system) that supplies power through a communication cable like the one explained in the Background section, there are cases where when the amount of power supplied from power source equipment (PSE) is limited or when the amount of power consumed by a powered device (PD) increases, sufficient power could not be supplied from the power source equipment (PSE) to the powered device (PD) and hence the powered device (PD) could not operate properly.

For example, there is a problem that in the case where a feed system that supplies power through a communication cable is used as a power supply source for a radio communication device, if the amount of power supplied to the radio communication device is smaller than the amount of power consumed by the radio communication device, the radio communication device does not operate properly. The technique disclosed in Patent Literature 1 solves the above-described problem by using a supplemental power source. However, the use of the supplemental power source makes the device configuration more complicated.

In view of the above-described problem, an object of the present invention is to provide a radio communication device and a method for controlling a radio communication device capable of realizing a stable operation even when a feed system that supplies power through a communication cable is used.

Solution to Problem

A radio communication device according to the present invention is a radio communication device to which power is supplied through a communication cable, including a control unit that determines a setting content of the radio communication device so that an amount of power consumption does not exceed an amount of power supply, the amount of the power consumption being calculated by using power consumption information associating the setting content of the radio communication device with power consumption consumed when the radio communication device operates with that setting content.

A method for controlling a radio communication device according to the present invention is a method for controlling a radio communication device to which power is supplied through a communication cable, including: acquiring information about an amount of power supply supplied to the radio communication device; calculating an amount of power consumption of the radio communication device consumed when the radio communication device is configured by using a predetermined setting content, by using power consumption information associating the setting content of the radio communication device with power consumption consumed when the radio communication device is configured by using that setting content; and configuring, when the calculated amount of power consumption does not exceed the amount of the supplied power supply, the radio communication device by using the predetermined setting content.

Advantageous Effects of Invention

According to the present invention, it is possible to provide a radio communication device and a method for controlling a radio communication device capable of realizing a stable operation even when a feed system that supplies power through a communication cable is used.

BRIEF DESCRIPTION OF DRAWINGS

FIG. 4 is a table showing an example of power consumption information stored in a power consumption information storage unit;

FIG. 5 is a table showing another example of power consumption information stored in the power consumption information storage unit;

DESCRIPTION OF EMBODIMENTS

<First Exemplary Embodiment>

Exemplary embodiments according to the present invention are explained hereinafter with reference to the drawings.

Figure 1:
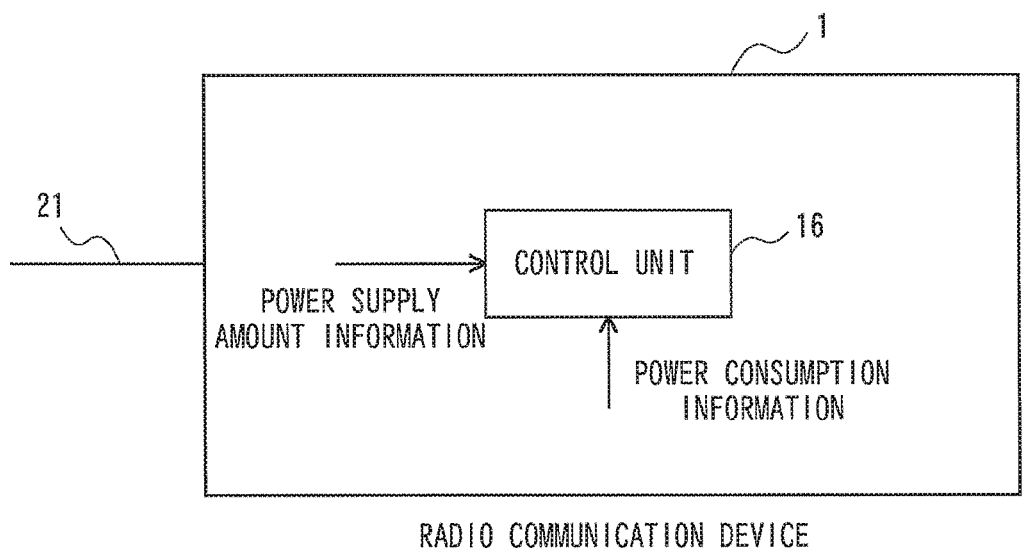
FIG. 1 is a block diagram showing a radio communication device according to a first exemplary embodiment.

FIG. 1 is a block diagram showing a radio communication device according to a first exemplary embodiment. The radio communication device 1 according to this exemplary embodiment includes a control unit 16. Power is supplied to the radio communication device 1 through a communication cable 21. The control unit 16 determines a setting content of the radio communication device 1 so that the amount of power consumption calculated by using power consumption information associating the setting content of the radio communication device 1 with power consumption consumed when the radio communication device 1 operates with that setting content does not exceed the amount of power supply supplied to the radio communication device 1. The radio communication device 1 according to this exemplary embodiment is explained hereinafter in detail.

Figure 2:
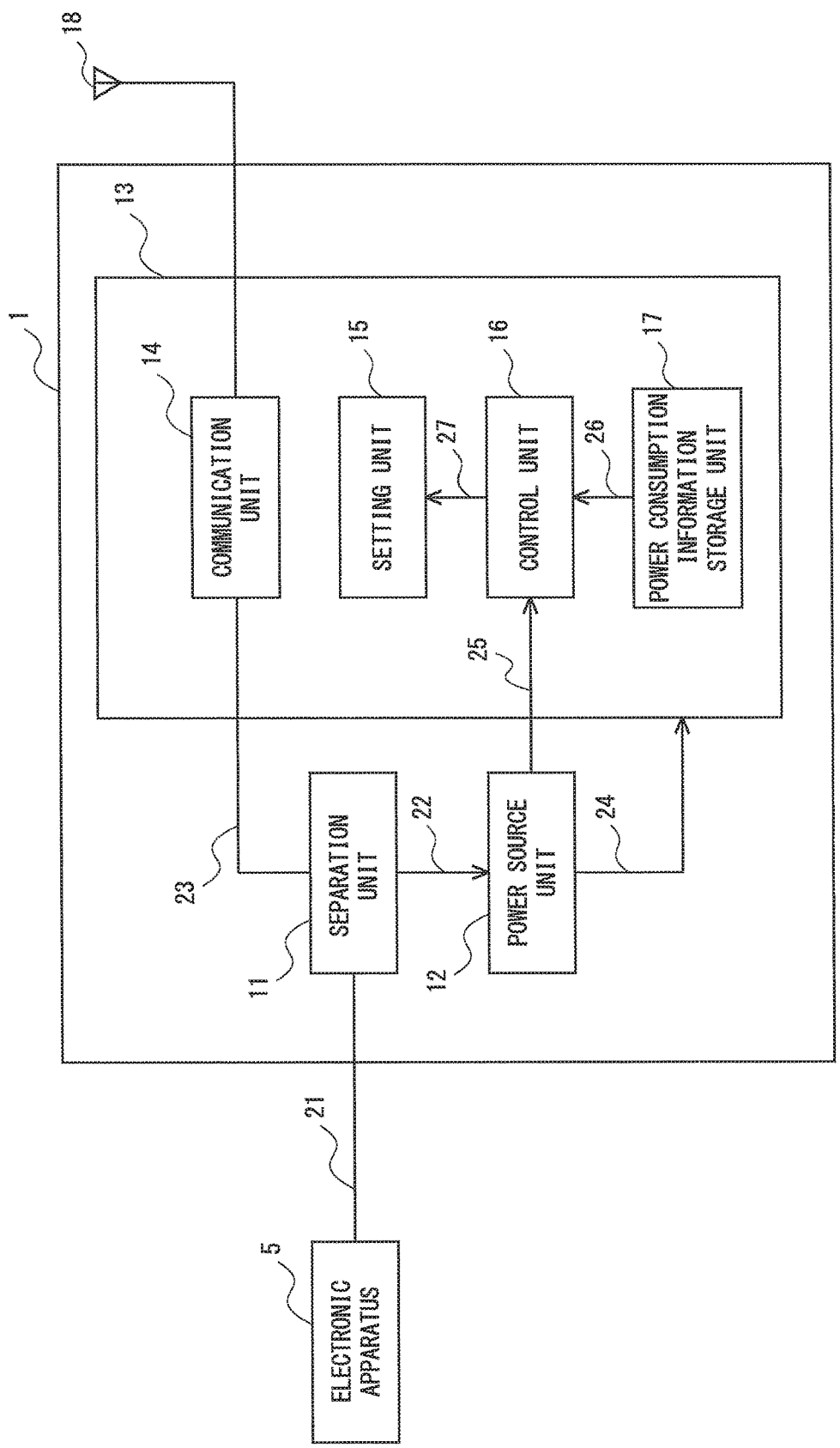
FIG. 2 is a block diagram showing an example of a radio communication device according to the first exemplary embodiment.

FIG. 2 is a block diagram showing an example of a radio communication device according to the first exemplary embodiment. As shown in FIG. 2, the radio communication device 1 according to this exemplary embodiment includes a separation unit 11, a power source unit 12, a communication unit 14, a setting unit 15, a control unit 16, a power consumption information storage unit 17, and an antenna 18. Note that the communication unit 14, the setting unit 15, the control unit 16, and the power consumption information storage unit 17 constitute an internal circuit 13 (i.e., a main circuit) of the radio communication device 1.

The radio communication device 1 is connected to another electronic apparatus 5 through the communication cable 21. The electronic apparatus 5 supplies power to the radio communication device 1 through the communication cable 21. Further, when the radio communication device 1 is a transmitter device, the radio communication device 1 wirelessly transmits communication data supplied from the electronic apparatus 5 through the communication cable 21. When the radio communication device 1 is a transmitter/receiver device, the radio communication device 1 wirelessly transmits communication data supplied from the electronic apparatus 5 through the communication cable 21 and supplies communication data that the radio communication device 1 has received to the electronic apparatus 5 through the communication cable 21. Note that although the following explanation is given by using an example where the radio communication device 1 is a transmitter/receiver device, the radio communication device 1 may be a transmitter device in this exemplary embodiment.

The separation unit 11 separates power from communication data supplied through the communication cable 21 and outputs the separated power 22 to the power source unit 12. Further, the separation unit 11 outputs communication data (transmission data) 23 supplied through the communication cable 21 to the communication unit 14. Further, the separation unit 11 outputs communication data (reception data) 23 output from the communication unit 14 to the communication cable 21.

For example, the separation unit 11 connects one of the wiring lines included in the communication cable 21 through which communication data is transmitted to a wiring line connected to the communication unit 14 (i.e., a wiring line through which the communication data 23 is transmitted). Further, the separation unit 11 connects another one of the wiring lines included in the communication cable 21 through which power is transmitted to a wiring line connected to the power source unit 12 (i.e., a wiring line through which the power 22 is transmitted).

The power source unit 12 supplies the power 22 separated by the separation unit 11 to the radio communication device 1 (i.e., to the internal circuit 13 of the radio communication device 1) as power supply 24. Further, the power source unit 12 supplies information 25 about the amount of power supply of the power supply 24 supplied to the internal circuit 13 (hereinafter also referred to simply as a "power supply amount 25"). The information 25 about the power supply amount can be acquired by, for example, measuring the power 22 in the power source unit 12.

Further, in the case of the PoE feed system, the power supply amount is specified under the standards such as IEEE 802.3af and IEEE 802.3at. For example, under the IEEE 802.3af, it is specified as follows: the maximum power for use (the maximum power supply amount) for a powered apparatus in the class 0 is 13.0 W; the maximum power for use for a powered apparatus in the class 1 is 3.84 W; the maximum power for use for a powered apparatus in the class 2 is 6.49 W; and the maximum power for use for a powered apparatus in a class 3 is 12.95W. Further, under the IEEE 802.3at, the maximum power for use for a powered apparatus in the class 4 is 25.5 W. When the PoE feed system is used, information about the classes 0 to 4 may be used as the information 25 about the power supply amount.

The communication unit 14 wirelessly communicates with another radio communication device. That is, the communication unit 14 wirelessly transmits communication data (transmission data) separated by the separation unit 11 from the antenna 18. Further, the communication unit 14 supplies communication data (reception data) received through the antenna 18 to the communication cable 21 through the separation unit 11.

The setting unit 15 makes various settings for the radio communication device 1. For example, the setting unit 15 makes settings for the transmission capacity, the modulation mode, the transmission power, and so on of the radio communication device. Note that the transmission capacity is the capacity when the radio communication device 1 simultaneously transmits and receives data. The larger the transmission capacity is, the more the power consumption of the radio communication device 1 increases. For example, in the case where a link aggregation technique is used, the transmission capacity corresponds to the number of ports that are simultaneously used. The fewer the number of used ports is, the smaller the transmission capacity becomes and the smaller the power consumption becomes. On the contrary, the larger the number of used ports is, the larger the transmission capacity becomes and the larger the power consumption becomes. The modulation mode is, for example, a modulation mode such as QPSK (Quadrature Phase Shift Keying), 16QAM (Quadrature amplitude modulation), and 64QAM, Further, the setting unit 15 may have an AMR (Adaptive Modulation Radio) function for automatically changing the modulation mode and/or the transmission capacity according to the radio environment such as radio channel quality.

In addition to the above-described settings, the setting unit 15 can make other settings such as a setting for an XPIC (cross polarization interference canceller), a setting for a redundant configuration (hot-standby and cold-standby settings), a setting for the number of revolutions of a fan mounted to cool the internal circuit of the radio communication device 1, and a setting for the brightness of a display unit provided in the radio communication device 1. Note that the XPIC (cross polarization interference canceller) is a circuit for suppressing interference between two polarized waves. Further, the hot-standby is a configuration in a redundant configuration including an active system and a standby system in which the standby system as well as the active system are continuously maintained in an operating state. The cold-standby is a configuration in the redundant configuration including the active system and the standby system in which the standby system is not continuously maintained in an operating state but is activated when a trouble occurs in the active system. Therefore, the power consumption of the cold-standby is smaller than that of the hot-standby.

The power consumption information storage unit 17 stores power consumption information that associates setting contents for the radio communication device 1 with power consumption that is consumed when the radio communication device 1 is configured by using those setting contents. Note that the setting contents for the radio communication device 1 are various settings for the radio communication device 1 configured by the setting unit 15. Examples of the settings include the transmission capacity, the modulation mode, the transmission power, and so on of the radio communication device 1.

FIG. 4 shows an example of power consumption information stored in the power consumption information storage unit 17. As shown in FIG. 4, the power consumption information storage unit 17 stores power consumption information associating transmission capacities of the radio communication device 1 with its power consumption, power consumption information associating modulation modes of the radio communication device 1 with its power consumption, and power consumption information associating transmission power of the radio communication device 1 with its power consumption. Further, the power consumption information storage unit 17 stores power consumption information associating settings (on/off settings) for an XPIC (cross polarization interference canceller) with power consumption and power consumption information associating settings for a redundant configuration (hot-standby and cold-standby settings) with power consumption. Note that in the radio communication device 1 according to this exemplary embodiment, the power consumption information stored in the power consumption information storage unit 17 is not limited to the aforementioned information and may be other power consumption information. Further, the power consumption information may be at least one type of power consumption information among the transmission capacity, the modulation mode, the transmission power, the XPIC setting, and the redundant configuration setting.

In the example shown in FIG. 4, in the case of the transmission capacities A to C, the power consumption is a (W) to c (W), respectively. In the case of the modulation modes E to G, the power consumption is e (W) to g (W), respectively. In the case of the transmission power P to R, the power consumption is p (W) to r (W), respectively. When the XPIC setting is in an on-state, the power consumption is v (W), whereas when the XPIC setting is in an off-state, the power consumption is x (W). When the redundant configuration setting is in a hot-standby state, the power consumption is y (W), whereas when the redundant configuration setting is in a cold-standby state, the power consumption is z (W). In the case of the transmission capacity A, for example, the power consumption a (W) is the power consumption that is added when the transmission capacity of the radio communication device 1 is set to the transmission capacity A. In the case where the transmission capacity A, the modulation mode E, and the transmission power P are set as the settings for the radio communication device 1, for example, the power consumption of the radio communication device 1 is obtained by adding the value expressed as "a+e+p (W)" to the power consumption other than the power consumption for those settings (e.g., the power consumption consumed in the internal circuit 13).

FIG. 5 shows another example of power consumption information stored in the power consumption information storage unit 17. As shown in FIG. 5, the power consumption information storage unit 17 may store power consumption associating combinations of setting contents for the radio communication device 1 (e.g., a combination of a predetermined transmission capacity, a predetermined modulation mode, a predetermined transmission power, an XPIC setting, and a redundant configuration setting) with power consumption of the radio communication device 1 that is consumed when those combinations of setting contents are applied.

Further, combinations of setting contents in which specific functions are prioritized (pre-settings) such as a pre-setting in which the transmission capacity is prioritized and a pre-setting in which the reliability is prioritized may be prepared. For example, in the case of a radio communication device having an AMR function, the modulation mode is determined according to the radio environment. In this case, a pre-setting in which a combination of other parameters is determined according to the modulation mode that the radio communication device can choose may be prepared. That is, under the restriction for the modulation mode of the radio communication device, a pre-setting in which a specific function is prioritized (such as a pre-setting in which the transmission capacity is prioritized and a pre-setting in which the reliability is prioritized) may be prepared. By preparing such pre-settings, it is possible to apply a setting in which a specific function is prioritized even when the modulation mode of the radio communication device is set by using the AMR function. For example, the setting S shown in FIG. 5 indicates that the power consumption of the radio communication device 1 when the radio communication device 1 is configured with the setting S (pre-setting) is s (W). Further, the power consumption information storage unit 17 may store, for example, power consumption information that covers all the combinations of the transmission capacity, the modulation mode, the transmission power, the XPIC setting, and the redundant configuration setting.

The control unit 16 shown in FIG. 2 controls the setting unit 15. That is, the control unit 16 acquires information 25 about the power supply amount from the power source unit 12 and acquires power consumption information 26 from the power consumption information storage unit 17. Then, the control unit 16 determines the setting content for the radio communication device 1 so that the power consumption amount of the radio communication device 1 calculated by using the power consumption information 26 does not exceed the amount of power supply supplied to the radio communication device 1 (in other words, so that the power consumption amount becomes equal to or smaller than the power supply amount). The control unit 16 outputs the determined setting information 27 to the setting unit 15.

Figure 3:
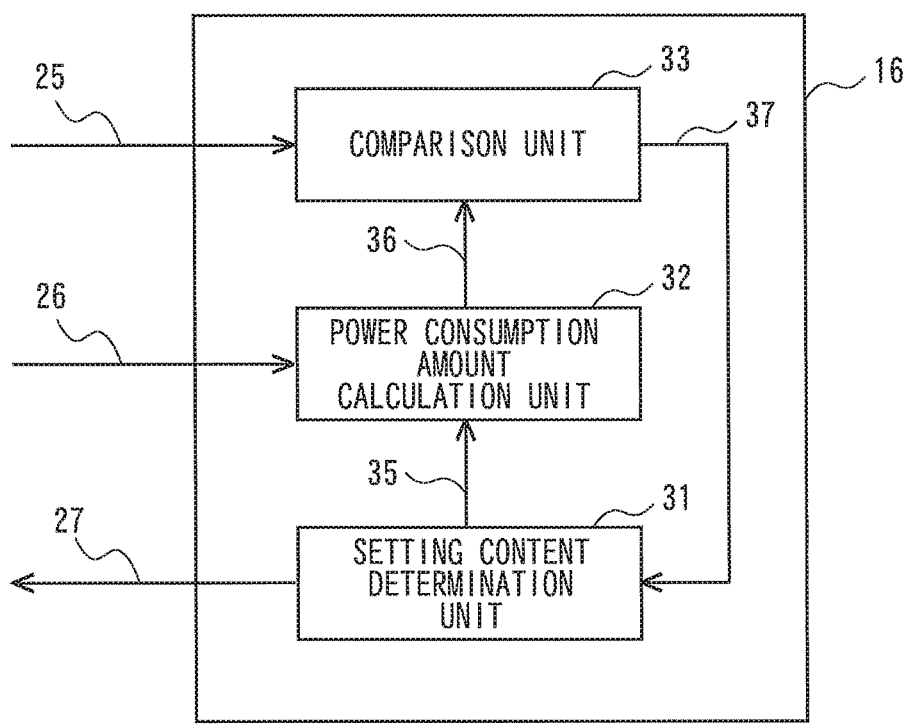
FIG. 3 is a block diagram showing an example of a control unit provided in the radio communication device according to the first exemplary embodiment.

FIG. 3 is a block diagram showing an example of the control unit 16 provided in the radio communication device 1 according to this exemplary embodiment. As shown in FIG. 3, the control unit 16 includes a setting content determination unit 31, a power consumption amount calculation unit 32, and a comparison unit 33.

The setting content determination unit 31 determines a setting content for the radio communication device 1 and outputs the determined setting content 35 to the power consumption amount calculation unit 32. For example, the setting content determination unit 31 determines the transmission capacity, the modulation mode, the transmission power and so on of the radio communication device 1.

The power consumption amount calculation unit 32 calculates the power consumption amount of the radio communication device 1 according to the setting content 35 determined by the setting content determination unit 31 by using the power consumption information 26 acquired from the power consumption information storage unit 17. The calculated power consumption amount 36 is output to the comparison unit 33.

The comparison unit 33 compares the calculated power consumption amount 36 with the amount of power supply 25 supplied to the radio communication device 1. Then, the comparison unit 33 outputs the comparison result 37 to the setting content determination unit 31. When the comparison result 37 indicates that the calculated power consumption amount 36 does not exceed the power supply amount 25, the setting content determination unit 31 outputs the determined setting content as a setting content 27 for the radio communication device. On the other hand, when the comparison result 37 indicates that the calculated power consumption amount 36 exceeds the power supply amount 25, the setting content determination unit 31 determines a setting content for the radio communication device 1 again. At this time, the setting content determination unit 31 determines the setting content so that the power consumption amount in the newly-determined setting content is smaller than the power consumption amount in the previous setting content. The setting content determination unit 31 repeats the determination of the setting content until the calculated power consumption amount 36 becomes equal to or smaller than the power supply amount 25.

Figure 6:
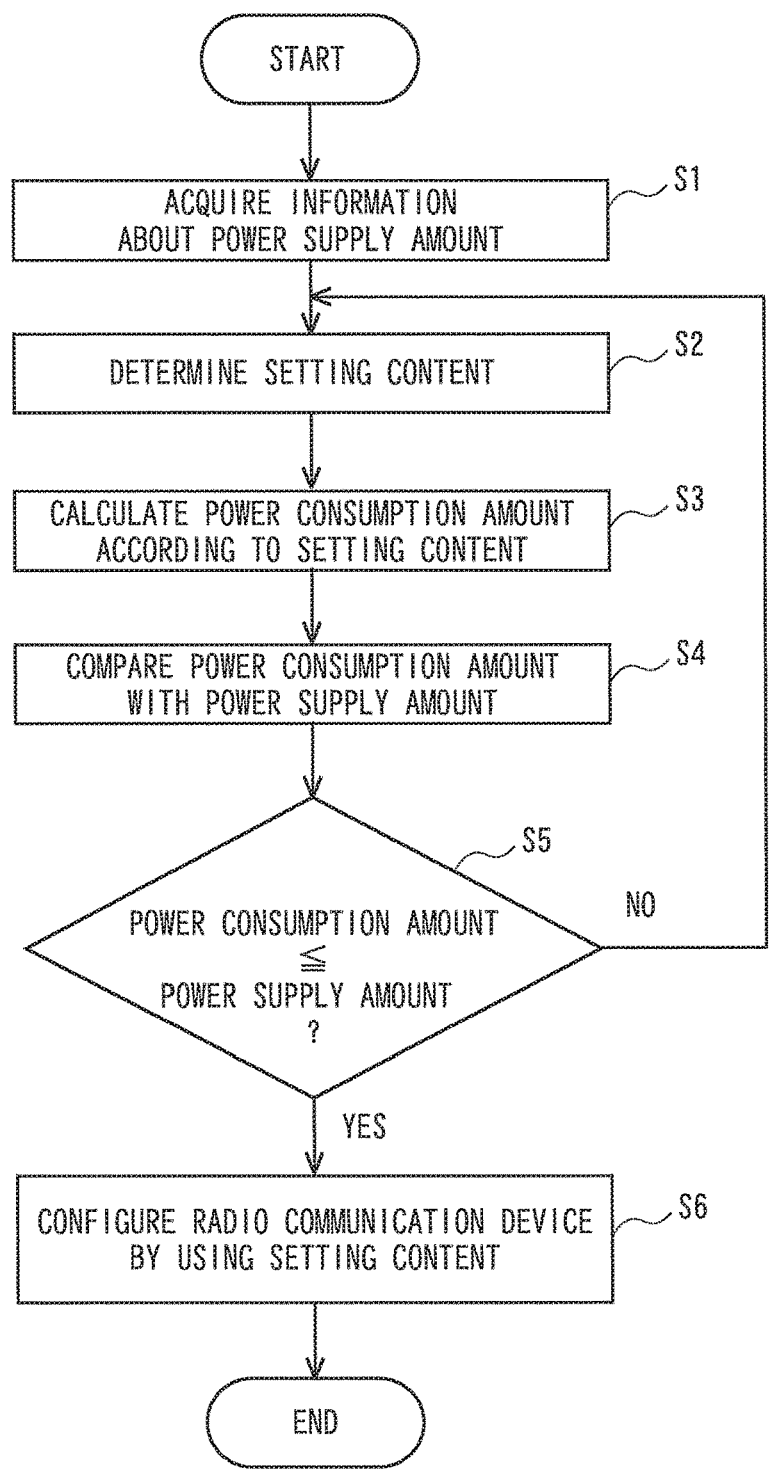
FIG. 6 is a flowchart for explaining an operation of the radio communication device according to the first exemplary embodiment.

Next, an operation of the radio communication device 1 according to this exemplary embodiment is explained with reference to a flowchart shown in FIG. 6. Note that it is assumed that power consumption information is stored in advance in the power consumption information storage unit 17. An operation in which the radio communication device 1 is configured by using a predetermined setting content is explained hereinafter in detail.

Firstly, the control unit 16 acquires information 25 about a power supply amount from the power source unit 12 (step S1). Next, the control unit 16 determines a setting content for the radio communication device 1 (step S2). Note that determining a setting content means to set various parameters of the radio communication device 1 such as the transmission capacity, the modulation mode, and the transmission power. After that, the control unit 16 calculates the power consumption amount of the radio communication device 1 according to the determined setting content by using power consumption information 26 stored in the power consumption information storage unit 17 (step S3). Further, the control unit 16 compares the calculated power consumption amount with the amount of power supply supplied from the power source unit 12 (step S4). Then, when the calculated power consumption amount does not exceed the power supply amount, the control unit 16 configures the radio communication device 1 by using the determined setting content (step S6).

On the other hand, when the calculated power consumption amount exceeds the power supply amount (step S5: No), the control unit 16 determines a setting content for the radio communication device 1 again (step S2). That is, in this case, the operations in the steps S2 to S5 are repeated until the calculated power consumption amount becomes equal to or smaller than the power supply amount. For example, the control unit can reduce the power consumption amount of the radio communication device 1 by changing at least one of the setting contents for the transmission capacity, the modulation mode, and the transmission power of the radio communication device 1.

The above-described process can be performed, for example, upon power-up of the radio communication device 1. In other words, the control unit 16 may determine the setting content for the radio communication device upon power-up of the radio communication device 1.

Further, the amount of power supply supplied to the radio communication device 1 may be monitored in the control unit 16. Then, the above-explained process for determining a setting content for the radio communication device may be performed when a difference between the amount of power supply supplied to the radio communication device 1 and the power consumption amount of the radio communication device 1 calculated by using the power consumption information 26 becomes equal to or less than a predetermined threshold. Note that the state where the difference between the power supply amount and the power consumption amount becomes equal to or less than the predetermined threshold means a state where the power supply amount decreases and hence the difference between the power supply amount and the power consumption amount becomes smaller. In such a case, since there is a possibility that the power consumption amount may exceed the power supply amount, the setting content of the radio communication device is changed in advance by using the above-described process. Note that the predetermined threshold can be arbitrarily determined.

In a feed system (e.g., a PoE feed system) that supplies power through a communication cable like the one explained in the Background section, there have been cases where when the amount of power supplied from power source equipment (PSE) is limited or when the amount of power consumed by a powered device (PD) increases, sufficient power could not be supplied from the power source equipment (PSE) to the powered device (PD) and hence the powered device (PD) could not operate properly.

For example, there has been a problem that in the case where a feed system that supplies power through a communication cable is used as a power supply source for a radio communication device, if the amount of power supplied to the radio communication device is smaller than the amount of power consumed by the radio communication device, the radio communication device does not operate properly.

Therefore, in the radio communication device according to this exemplary embodiment, information about the amount of power supply supplied to the radio communication device 1 is acquired and the amount of power consumption of the radio communication device consumed when the radio communication device is configured by using a predetermined setting content is calculated by using previously-prepared power consumption information. Then, when the calculated power consumption amount does not exceed the power supply amount, the radio communication device is configured by using the predetermined setting content.

Therefore, in the radio communication device according to this exemplary embodiment, it is possible to configure the radio communication device so that the power consumption amount in the radio communication device does not exceed its power supply amount. That is, the setting content for the radio communication device can be appropriately changed according to the amount of the supplied power supply. Therefore, it is possible to provide a radio communication device and a method for controlling a radio communication device capable of realizing a stable operation even when a feed system that supplies power through a communication cable is used. Further, unlike the technique disclosed in Patent Literature 1, there is no need to use a supplemental power source, thus making it possible to simplify the device configuration.

<Second Exemplary Embodiment>

Figure 7:
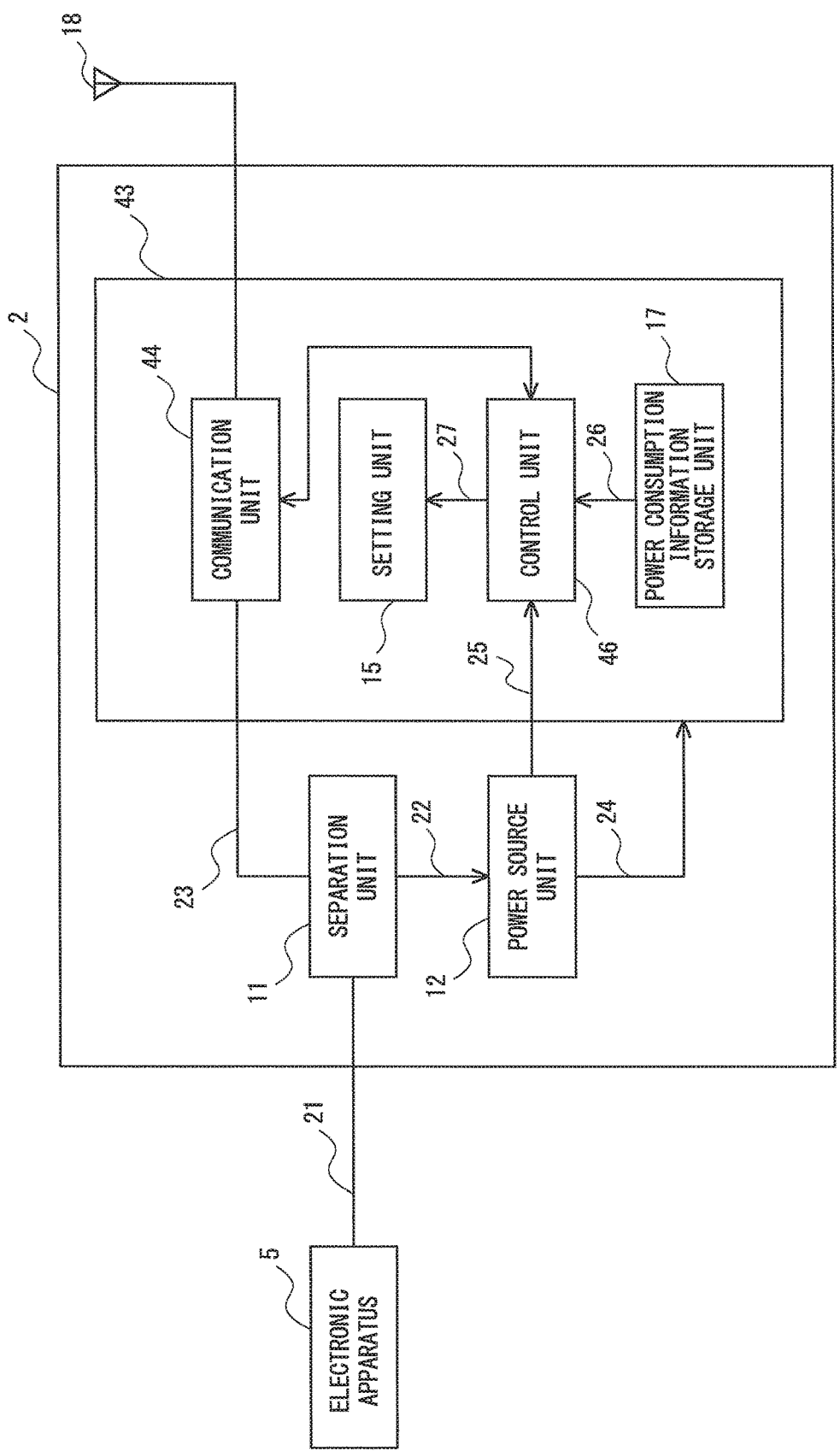
FIG. 7 is a block diagram showing a radio communication device according to a second exemplary embodiment.

Next, a second exemplary embodiment according to the present invention is explained. FIG. 7 is a block diagram showing a radio communication device according to a second exemplary embodiment. The radio communication device according to this exemplary embodiment differs from the radio communication device explained above in the first exemplary embodiment in that the radio communication device according to this exemplary embodiment is configured so that the setting content of the radio communication device and a setting change request can be transmitted to another radio communication device. The rest of the configuration of the radio communication device according to this exemplary embodiment is similar to that of the radio communication device according to the first exemplary embodiment. Therefore, the same symbols are assigned to the same components and their detailed explanations are omitted.

As shown in FIG. 7, a radio communication device 2 according to this exemplary embodiment includes a separation unit 11, a power source unit 12, a communication unit 44, a setting unit 15, a control unit 46, a power consumption information storage unit 17, and an antenna 18. Note that the communication unit 44, the setting unit 15, the control unit 46, and the power consumption information storage unit 17 constitute an internal circuit 43 (i.e., a main circuit) of the radio communication device 2.

The radio communication device 2 is connected to another electronic apparatus 5 through the communication cable 21. The electronic apparatus 5 supplies power to the radio communication device 2 through the communication cable 21. Further, the radio communication device 2 wirelessly transmits communication data supplied from the electronic apparatus 5 through the communication cable 21 and supplies communication data that the radio communication device 2 has received to the electronic apparatus 5 through the communication cable 21.

Note that the configurations and the operations of the separation unit 11, the power source unit 12, the setting unit 15, and the power consumption information storage unit 17 are similar to those explained above in the first exemplary embodiment, and therefore duplicated explanations are omitted.

Similarly to the control unit 16 explained above in the first exemplary embodiment, the control unit 46 acquires information 25 about the power supply amount from the power source unit 12 and acquires power consumption information 26 from the power consumption information storage unit 17. Then, the control unit 46 determines a setting content for the radio communication device 2 so that the power consumption amount of the radio communication device 2 calculated by using the power consumption information 26 does not exceed the amount of the power supply supplied to the radio communication device 2. The control unit 46 outputs the determined setting information 27 to the setting unit 15. Similarly to the communication unit 14 explained above in the first exemplary embodiment, the communication unit 44 wirelessly communicates with another radio communication device.

Further, the control unit 46 outputs the setting content of the radio communication device 2 and a setting change request to the communication unit 44. The communication unit 44 wirelessly transmits the setting content of the radio communication device 2 and the setting change request to another radio communication device. Note that the setting change request is a signal for requesting another radio communication device to change its setting content by using the setting content of the radio communication device 2.

Further, when the communication unit 44 receives the setting content of another radio communication device and a setting change request, the communication unit 44 outputs the received setting content and the setting change request to the control unit 46. The control unit 46 changes the setting content of the radio communication device 2 based on the setting content of the other radio communication device. For example, the control unit 46 changes the setting content of the radio communication device 2 so that the setting content of the radio communication device 2 becomes identical to that of the other radio communication device.

Figure 8:
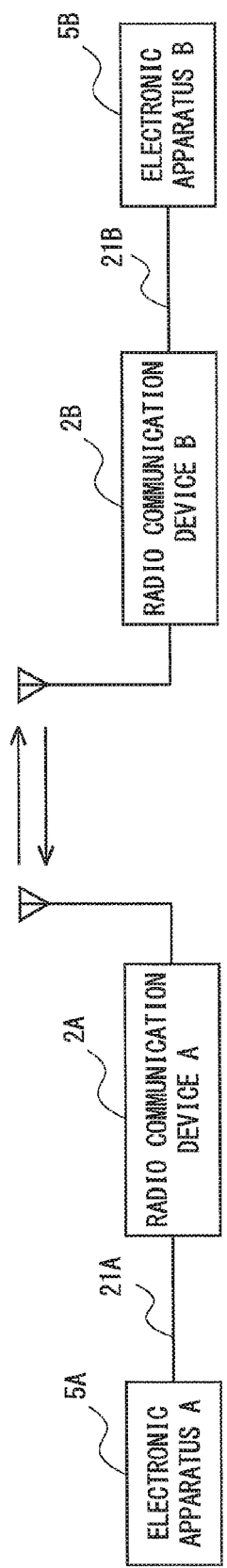
FIG. 8 is a block diagram showing a state where radio communication devices according to the second exemplary embodiment communicate with each other.

That is, when a plurality of radio communication devices wirelessly communicate with each other, a pair of radio communication devices, which communicate with each other, need to have setting contents (such as the transmission capacity, the modulation mode, and the transmission power) identical to each other. FIG. 8 is a block diagram showing a state where radio communication devices each of which is configured according to this exemplary embodiment communicate with each other. In FIG. 8, each of a radio communication device A (2A) and a radio communication device B (2B) has a configuration identical to that of the radio communication device 2 according to this exemplary embodiment shown in FIG. 7. As shown in FIG. 8, when the radio communication device A (2A) and the radio communication device B (2B) communicate with each other, the radio communication device A (2A) and the radio communication device B (2B) need to have setting contents (such as the transmission capacity, the modulation mode, and the transmission power) identical to each other.

An operation for making the setting contents for the radio communication device A (2A) and the radio communication device B (2B) identical to each other is explained hereinafter with reference to a flowchart shown in FIGS. 9 and 10. Note that in the following explanation, "A" is added to the symbol of each component of the radio communication device A (2A) and "B" is added to the symbol of each component of the radio communication device B (2B). For example, the control unit provided in the radio communication device A (2A) is expressed as the "control unit 46A" and the control unit provided in the radio communication device B (2B) is expressed as the "control unit 46B".

Figure 9:
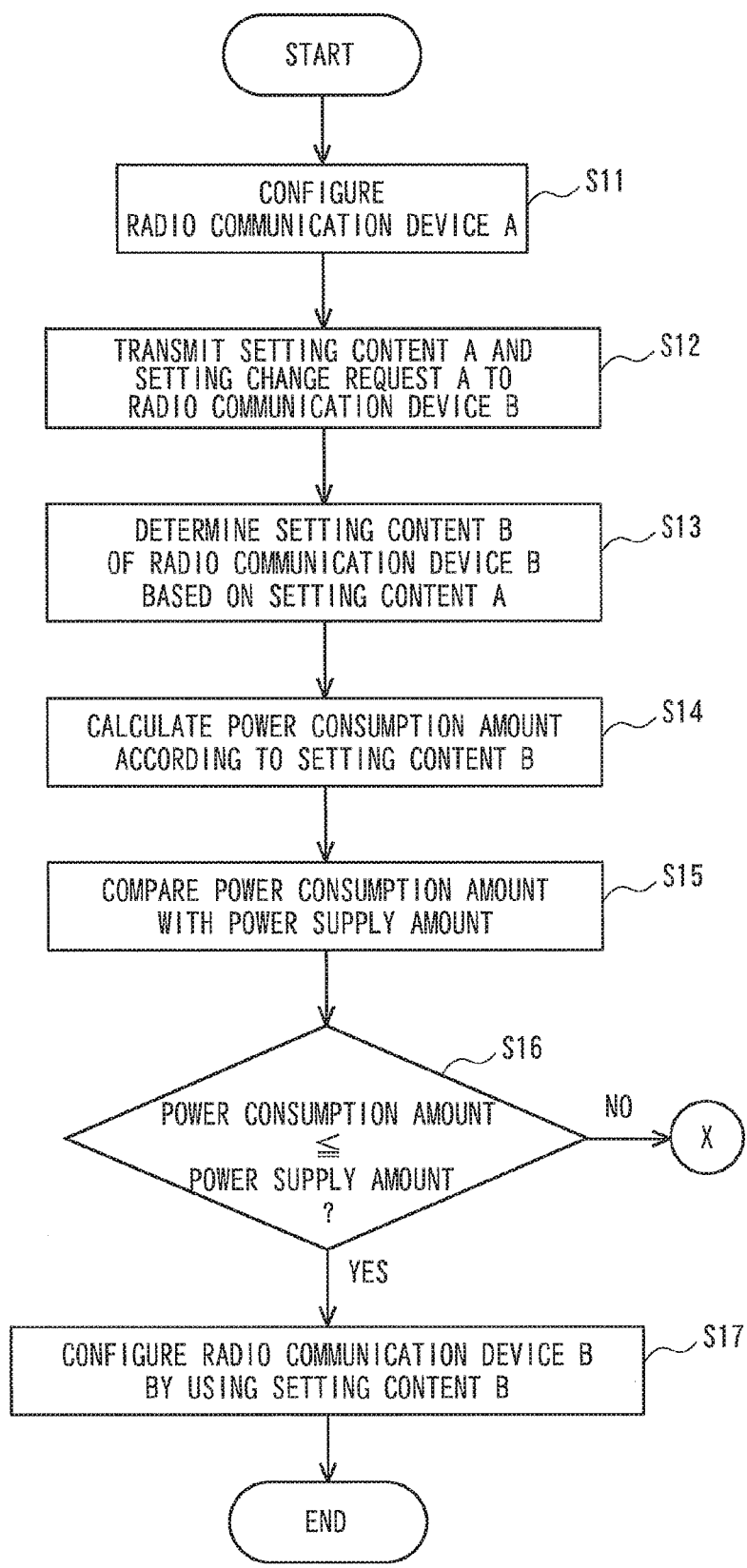
FIG. 9 is a flowchart for explaining an operation of the radio communication device according to second first exemplary embodiment.
Figure 10:
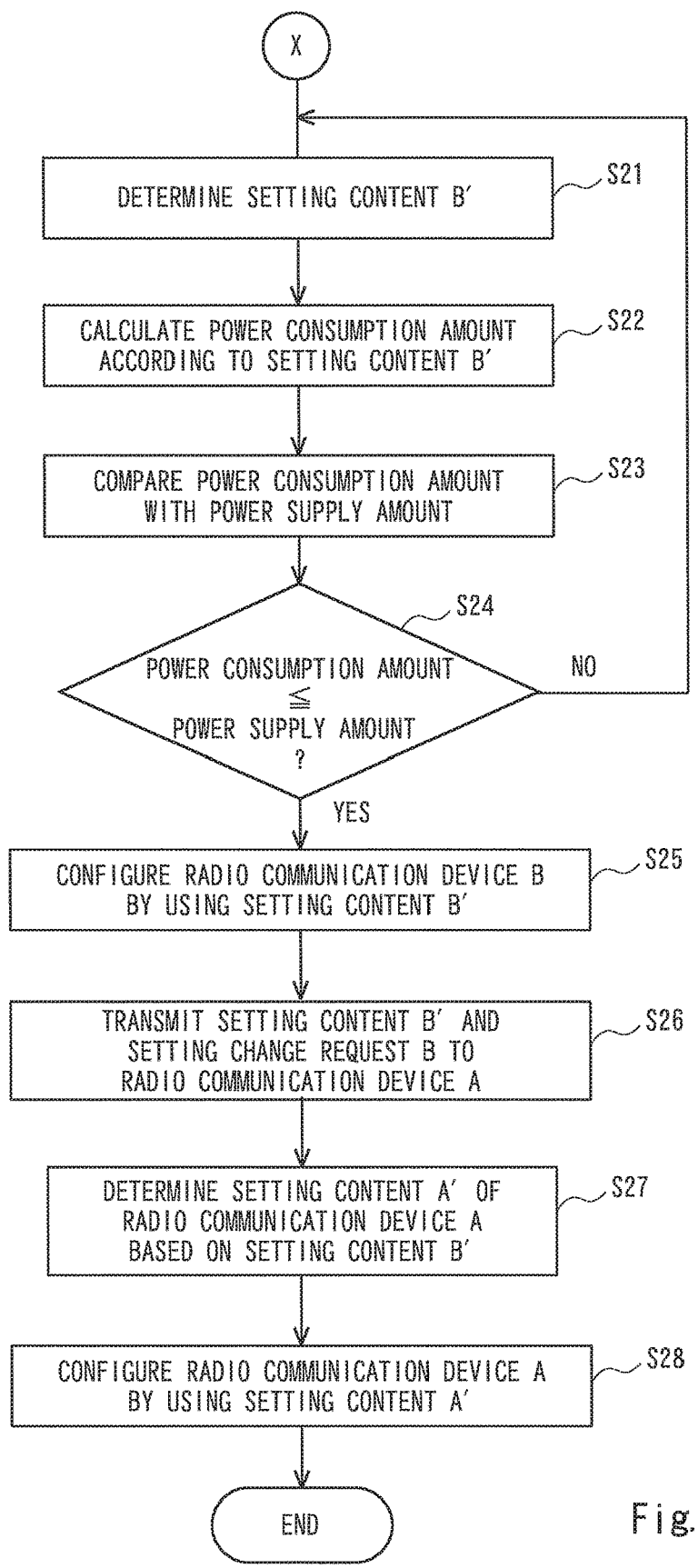
FIG. 10 is a flowchart for explaining an operation of the radio communication device according to the second exemplary embodiment.

As shown in FIG. 9, the radio communication device A (2A) makes its setting based on a setting content determined by the control unit 46A (step S11). Note that the step S11 shown in FIG. 9 corresponds to the step S6 in the flowchart shown in FIG. 6. Therefore, even in this case, when the radio communication device A (2A) makes its setting, the radio communication device A (2A) performs the processes in the steps S1 to S6 in the flowchart shown in FIG. 6.

Next, the radio communication device A (2A) transmits the setting content A for the radio communication device A (2A) and a setting change request A to the radio communication device B (2B) (step S12). That is, the control unit 46A of the radio communication device A (2A) outputs the setting content A for the radio communication device A (2A) and the setting change request A to the communication unit 44A. The communication unit 44A transmits the setting content A for the radio communication device A (2A) and the setting change request A to the radio communication device B (2B).

Upon receiving the setting content A for the radio communication device A (2A) and the setting change request A, the radio communication device B (2B) determines a setting content B for the radio communication device B (2B) based on the setting content A for the radio communication device A (2A) (step S13). That is, the control unit 46B of the radio communication device B (2B) determines the setting content B for the radio communication device B (2B) so that the setting content B for the radio communication device B (2B) becomes identical to the setting content A for the radio communication device A (2A).

Next, the control unit 46B of the radio communication device B (2B) calculates the power consumption amount of the radio communication device B (2B) according to the determined setting content B by using power consumption information 26B stored in the power consumption information storage unit 17B (step S14). Further, the control unit 46B compares the calculated power consumption amount with the amount of power supply supplied from the power source unit 12B (step S15). Then, when the calculated power consumption amount does not exceed the power supply amount (step S16: Yes), the control unit 46B configures the radio communication device B (2B) by using the determined setting content B (step S17).

On the other hand, when the power consumption amount calculated in the radio communication device B (2B) exceeds the power supply amount (step S16: No), the control unit 46B determines a setting content B' for the radio communication device B (2B) so that the power consumption amount becomes smaller than that calculated based on the previously-determined setting content B (step S21 in FIG. 10). Next, the control unit 46B of the radio communication device B (2B) calculates the power consumption amount of the radio communication device B (2B) according to the determined setting content B' by using power consumption information 26B stored in the power consumption information storage unit 17B (step S22).

Further, the control unit 46B compares the calculated power consumption amount with the amount of power supply supplied from the power source unit 12B (step S23). Then, when the calculated power consumption amount does not exceed the power supply amount (step S24: Yes), the control unit 46B configures the radio communication device B (2B) by using the determined setting content B (step S25).

On the other hand, when the calculated power consumption amount exceeds the power supply amount (step S24: No), the control unit 46B determines a setting content for the radio communication device B (2B) again (step S21). That is, in this case, the operations in the steps S21 to S24 are repeated until the calculated power consumption amount becomes equal to or smaller than the power supply amount. For example, it is possible to reduce the power consumption amount of the radio communication device B (2B) by changing at least one of the setting contents for the transmission capacity, the modulation mode, and the transmission power of the radio communication device B (2B).

After configuring the radio communication device B (2B) by using the setting content B', the radio communication device B (2B) transmits the setting content B' of the radio communication device B (2B) and a setting change request B to the radio communication device A (2A) (step S26). That is, the control unit 46B of the radio communication device B (2B) outputs the setting content B' of the radio communication device B (2B) and the setting change request B to the communication unit 44B. The communication unit 44B transmits the setting content B' of the radio communication device B (2B) and the setting change request B to the radio communication device A (2A).

Upon receiving the setting content B' of the radio communication device B (2B) and the setting change request B, the radio communication device A (2A) determines a setting content A' for the radio communication device A (2A) based on the setting content B' of the radio communication device B (2B) (step S27). That is, the control unit 46A of the radio communication device A (2A) determines the setting content A' for the radio communication device A (2A) so that the setting content A' for the radio communication device A (2A) becomes identical to the setting content B' for the radio communication device B (2B). After that, the control unit 46A configures the radio communication device A (2A) by using the setting content A' (step S28).

Note that the power consumption amount of the radio communication device A (2A) when the radio communication device A (2A) is configured by using the setting content A' becomes smaller than that of the radio communication device A (2A) when the radio communication device A (2A) is configured by using the setting content A. Therefore, in this case, the step for calculating the power consumption amount of the radio communication device A (2A) according to the setting content A' (see the step S3) and the step for comparing the calculated power consumption amount with the power supply amount (see the step S4) can be omitted.

By the invention according to this exemplary embodiment explained above, it is possible to make the setting contents for a pair of radio communication devices that communicate with each other identical to each other.

Although the present invention is explained above with reference to exemplary embodiments, the present invention is not limited to the above-described exemplary embodiments. Various modifications that can be understood by those skilled in the art can be made to the configuration and details of the present invention within the scope of the invention.

This application is based upon and claims the benefit of priority from Japanese patent applications No. 2013-190691, filed on Sep. 13, 2013, the disclosure of which is incorporated herein in its entirety by reference.

REFERENCE SIGNS LIST 1, 2 RADIO COMMUNICATION DEVICE
5 ELECTRONIC APPARATUS

11 SEPARATION UNIT
12 POWER SOURCE UNIT
13 INTERNAL CIRCUIT
14, 44 COMMUNICATION UNIT
15 SETTING UNIT
16, 46 CONTROL UNIT
17 POWER CONSUMPTION INFORMATION STORAGE UNIT
18 ANTENNA
31 SETTING CONTENT DETERMINATION UNIT
32 POWER CONSUMPTION AMOUNT CALCULATION UNIT
33 COMPARISON UNIT

The invention claimed is:

1. A radio communication device to which power is supplied through a communication cable, comprising:
a control unit that determines setting content of the radio communication device so that an amount of power consumption does not exceed an amount of power supply, wherein the amount of the power consumption is calculated based on power consumption information associating the setting content with power consumed when the radio communication device operates with that setting content; and
a power consumption information storage unit that stores first power consumption information associating a transmission capacity of the radio communication device with its power consumption, second power consumption information associating a modulation mode of the radio communication device with its power consumption, and third power consumption information associating a transmission power of the radio communication device with its power consumption,
wherein the control unit comprises a power consumption calculation unit that calculates the amount of power consumption of the radio communication device based on the first to third power consumption information that correspond to the setting content of the radio communication device.

2. The radio communication device according to claim 1, further comprising:
a separation unit that separates power supplied through the communication cable from communication data;
a power source unit that supplies the power separated by the separation unit to the radio communication device;
a communication unit that wirelessly communicates with another radio communication device; and
a setting unit that configures the radio communication device.

3. The radio communication device according to claim 2, wherein the control unit comprises:
a setting content determination unit that determines setting content for the radio communication device; and
a comparison unit that compares the calculated amount of power consumption with the amount of power supply supplied to the radio communication device,
wherein when the calculated amount of power consumption does not exceed the amount of power supply, the setting content determination unit outputs the determined setting content to the setting unit as the setting content for the radio communication device.

4. The radio communication device according to claim 2, wherein the power consumption information storage unit stores power consumption information associating a combination of setting contents for the radio communication device with power consumption of the radio communication device consumed when that combination is applied.

5. The radio communication device according to claim 1, wherein the control unit determines the setting content of the radio communication device upon power-up of the radio communication device.

6. The radio communication device according to claim 1, wherein
the control unit monitors the amount of power supply supplied to the radio communication device; and
when a difference between the amount of power supply supplied to the radio communication device and the calculated amount of power consumption decreases to or below a predetermined threshold, the control unit changes the setting content of the radio communication device.

7. The radio communication device according to claim 1, wherein
the radio communication device is configured so that the radio communication device can transmit a setting change request and the setting content of the radio communication device to another radio communication device, and
the setting change request requests the another radio communication device to change its setting content by using the setting content of the radio communication device.

8. The radio communication device according to claim 1, wherein when the radio communication device receives the setting content of another radio communication device and a setting change request requesting the radio communication device to change its setting content by using the setting content of the another radio communication device, the radio communication device changes its setting content based on the setting content of the another radio communication device.

9. The radio communication device according to claim 8, wherein when the amount of power consumption of the radio communication device calculated based on the setting content of the another radio communication device does not exceed the amount of power supply supplied to the radio communication device, the control unit changes the setting content of the radio communication device based on the setting content of the another radio communication device.

10. The radio communication device according to claim 8, wherein when the amount of power consumption of the radio communication device calculated based on the setting content of the another radio communication device exceeds the amount of power supply supplied to the radio communication device, the control unit determines the setting content of the radio communication device so that the amount of power consumption does not exceed the amount of power supply supplied to the radio communication device and transmits the determined setting content and a setting change request to the another radio communication device.

11. A method for controlling a radio communication device to which power is supplied through a communication cable, comprising:
acquiring information about an amount of power supply supplied to the radio communication device;
calculating an amount of power consumption of the radio communication device consumed when the radio communication device is configured by using a predetermined setting content, by using power consumption information associating setting content of the radio communication device with power consumed when the radio communication device is configured by using that setting content;

configuring, when the calculated amount of power consumption does not exceed the amount of the supplied power supply, the radio communication device by using the predetermined setting content; and when the calculated amount of power consumption exceeds the amount of power supply, changing the predetermined setting content, wherein the power consumption information includes first power consumption information associating a transmission capacity of the radio communication device with its power consumption, second power consumption information associating a modulation mode of the radio communication device with its power consumption, and third power consumption information associating a transmission power of the radio communication device with its power consumption, and the amount of power consumption of the radio communication device is calculated by using the first to third power consumption information that correspond to the predetermined setting content of the radio communication device.

12. The method for controlling a radio communication device according to claim 11, wherein the power consumption information is power consumption information associating a combination of setting contents for the radio communication device with power consumption of the radio communication device consumed when that combination is applied.

13. The method for controlling a radio communication device according to claim 11, wherein the setting content of the radio communication device is determined upon power-up of the radio communication device.

14. The method for controlling a radio communication device according to claim 11, wherein the radio communication device transmits a setting change request and the setting content of the radio communication device to another radio communication device, wherein the setting change request requests the another radio communication device to change its setting content by using the setting content of the radio communication device.

15. The method for controlling a radio communication device according to claim 11, wherein when the radio communication device receives the setting content of another radio communication device and a setting change request requesting the radio communication device to change its setting content by using the setting content of the another radio communication device, the radio communication device changes its setting content based on the setting content of the another radio communication device.

16. The method for controlling a radio communication device according to claim 15, wherein when the amount of power consumption of the radio communication device calculated based on the setting content of the another radio communication device does not exceed the amount of power supply supplied to the radio communication device, the setting content of the radio communication device is changed based on the setting content of the another radio communication device.

17. The method for controlling a radio communication device according to claim 15, wherein when the amount of power consumption of the radio communication device calculated based on the setting content of the another radio communication device exceeds the amount of power supply supplied to the radio communication device, the setting content of the radio communication device is determined so that the amount of power consumption does not exceed the amount of power supply supplied to the radio communication device and the determined setting content and a setting change request are transmitted to the another radio communication device.

* * * * *